US009195652B2

(12) United States Patent
Custer et al.

(10) Patent No.: US 9,195,652 B2
(45) Date of Patent: Nov. 24, 2015

(54) AUTOMATED SYSTEMS AND METHODS FOR INTEGRATED MULTI-PLATFORM COMMUNICATION INCLUDING REAL-TIME LANGUAGE TRANSLATION

(75) Inventors: Justin E. Custer, Broomfield, CO (US); Michael P. Duffy, Highland Village, TX (US); Frederick T. Lamming, Denver, CO (US); Roy Vera, Houston, TX (US)

(73) Assignee: Accenture Global Services Limited, Dublin (IE)

( * ) Notice: Subject to any disclaimer, the term of this patent is extended or adjusted under 35 U.S.C. 154(b) by 1085 days.

(21) Appl. No.: 13/155,953

(22) Filed: Jun. 8, 2011

(65) Prior Publication Data
US 2012/0316861 A1 Dec. 13, 2012

(51) Int. Cl.
*G06F 17/00* (2006.01)
*G06F 17/28* (2006.01)

(52) U.S. Cl.
CPC .................................. *G06F 17/289* (2013.01)

(58) Field of Classification Search
CPC ....... G06F 17/20; G06F 17/28; G06F 17/289; G06F 17/2881
USPC ............................................................ 704/2
See application file for complete search history.

(56) References Cited

U.S. PATENT DOCUMENTS

| 5,864,788 | A * | 1/1999 | Kutsumi | 704/2 |
| 5,884,246 | A | 3/1999 | Boucher et al. | |
| 6,393,389 | B1 * | 5/2002 | Chanod et al. | 704/7 |
| 7,593,844 | B1 * | 9/2009 | Takeshita | 704/2 |
| 8,380,486 | B2 * | 2/2013 | Soricut et al. | 704/2 |
| 2002/0069048 | A1 | 6/2002 | Sadhwani et al. | |
| 2005/0049881 | A1 * | 3/2005 | Xun | 704/277 |
| 2005/0246156 | A1 * | 11/2005 | Scanlan | 704/2 |
| 2007/0050306 | A1 * | 3/2007 | McQueen | 705/77 |
| 2008/0172219 | A1 * | 7/2008 | Thomas | 704/8 |

FOREIGN PATENT DOCUMENTS

| WO | WO 02/067139 | 8/2002 |
| WO | WO 2004/042603 | 5/2004 |

OTHER PUBLICATIONS

Chen, Yu et al., "Multi-Engine Machine Translation With an Open-Source Decoder for Statistical Machine Translation", Proceedings of the Second Workshop on Statistical Machine Translation, Jun. 1, 2001, pp. 193-196, XP 055044037.
European Search Report, dated Nov. 20, 2012, issued for EP 12004362.5-1527, 8 pages.

* cited by examiner

*Primary Examiner* — Michael N Opsasnick
(74) *Attorney, Agent, or Firm* — Harrity & Harrity, LLP

(57) ABSTRACT

Disclosed are systems and methods for performing real-time language translations. These methods include integration of a plurality of modes of communication that can be implemented by both the sender and recipient of the message. Disclosed embodiments translate an incoming message, for example using a plurality of web-based translators. The system selects the preferred translation and transmits at least the preferred translation to the recipient via the recipient's preferred mode of communication. Disclosed embodiments allow the message recipient to change language selections on-the-fly. Disclosed embodiments enable the recipient to view the alternate translations from the plurality of web-based translators and select a translation of choice. The system uses this crowd sourcing information as feedback to improve the method.

29 Claims, 16 Drawing Sheets

AUTOMATED SYSTEMS AND METHODS FOR INTEGRATED MULTI-PLATFORM COMMUNICATION INCLUDING REAL-TIME LANGUAGE TRANSLATION

TECHNICAL FIELD

This invention relates to automated systems and methods for integrated multi-platform communication including real-time language translation.

BACKGROUND

Web-based communication interfaces are used for many purposes, including remote control support, helpdesk support, and general communication. With multinational corporations and contacts, it is often the case that users (including, but not limited to, support agents, clients, recipients, and senders) speak different languages. In order to communicate effectively, the users can utilize translation software. Existing technologies, however, are inflexible and are typically restricted to only one language translation application programming interface (API). This is not ideal, for example, because some translation APIs are better at translating particular languages, while being inferior at translating others. Utilizing the present technologies thus results in suboptimal translation accuracy.

In addition, current translation technologies typically use a single method of communication (e.g., chat, email, or short message service (SMS)). Currently available systems typically do not allow for users to communicate across multiple platforms. This makes many of the current technologies inconvenient, especially for clients who are travelling, busy, or who otherwise need to alter their mode of communication at various times.

Moreover, currently available technologies may require a user to install third party software programs for full functionality. This increases the time burden on the user, as well as the possibility of malfunctions.

SUMMARY

In response to these and other needs, the present disclosure provides a computer-implemented method and related system for facilitating communication among a sender and recipient. In particular, certain embodiments of the disclosure provide a method that can utilize automated translators to obtain a plurality of translations of the message in a second language that are then displayed to the recipient. This method further comprises receiving and processing a response to the plurality of translations from the recipient. In certain embodiments, the received response is a selection of one of the plurality of translations, while in certain other embodiments, the received response is an indication that none of the plurality of translations is acceptable. In certain embodiments, processing the response comprises combining the response with similar responses and updating the communication method based at least in part on the response.

Certain other embodiments of the disclosure provide a method for changing at least the language and mode of a responsive communication sent to the original sender. In particular, this method comprises determining both a first and current device preference of the original sender, as well as both a first and current language preference of the original sender. This method further comprises using automated translators to obtain a plurality of translations of the responding message in the currently-preferred language of the original sender, and presenting at least one of the plurality of translations of the responding message to the original sender via the original sender's currently-preferred device. In certain embodiments, the currently-preferred device is different from the first communication device. The device preference of the original sender can be received from the sender during the communication. In certain embodiments, the first language and currently-preferred language are different.

BRIEF DESCRIPTION OF THE DRAWINGS

A more complete understanding of the disclosed embodiments and advantages thereof may be acquired by referring to the following description taken in conjunction with the accompanying drawings in which like reference numbers indicate like features, wherein.

DETAILED DESCRIPTION

Figure 1A:
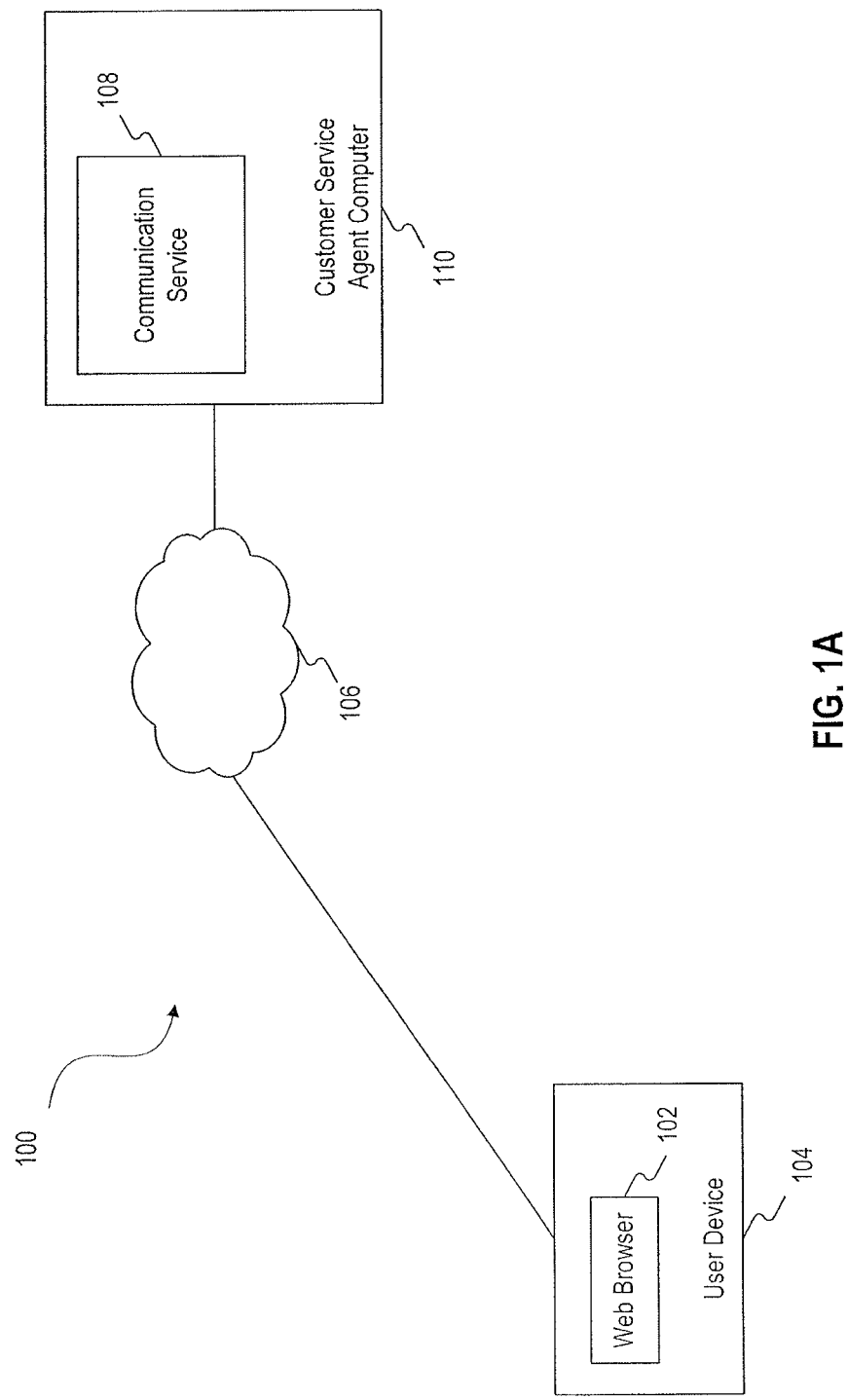
FIG. 1A is a block diagram depicting an embodiment of a web-based communication service and language translation system 100.

Systems and methods are disclosed for providing a new capability for users (including, but not limited to, support agents, clients, recipients, and senders) to easily communicate in different languages in real-time across multiple communication platforms (e.g., email, chat, SMS, etc.). Systems and methods are disclosed that are capable of utilizing a user's input and computer information (including, but not limited to, language identification and/or ID settings) to determine an initial language setting. In certain embodiments, both the sender and recipient are allowed to make preferred language selections on-the-fly. Once a language is selected, the system may receive the sender's communication and translate it into the recipient's selected language. In some embodiments, the system may produce a preferred translation of an incoming communication (translated into the selected language), which is initially displayed to the user. In some embodiments, the system may produce alternate translations of an incoming communication (translated into the selected language) and may allow the recipient to view and select among the alternate translations (or, if applicable, the recipient can choose none of the given translations). In this way, user is able to view additional computer-implemented translations in the event that an initially preferred and displayed translation is not optimally comprehensible. The language translation system may utilize this user selection data to adjust and optimize the language translation algorithm (including, but not limited to, changing the translation API for a given situation, offering suggestions to the user, updating words in the custom dictionary, etc.).

Once a communication is received for translation, the system may "crowd source" the translation by consulting multiple language translation tools. For example, translations may be obtained from three different translators and all three alternative translations may be presented to the recipient. If the recipient selects one of the three translations, the system may note that the translator that provided the selected translation is preferred for the language involved. The recipient's selection may be combined with responses from other users. Over time, the system may adapt the translation algorithms accordingly. In this way, the translation algorithm is able to adapt and initially select and display a computer-implemented translation that has been chosen as optimal by a population of users.

In certain embodiments, the system utilizes a custom dictionary and/or custom library to filter and assess words and/or acronyms that may be difficult for an automated translator to translate (including, but not limited to, jargon, slang, and/or acronyms). Furthermore, certain embodiments utilize on-the-fly custom or third-party grammar and spellchecking systems to insure words are in a form that is most easily recognized and translated by the API. In certain embodiments, the system interface may indicate words that were unable to be translated (e.g., proper names).

In certain embodiments, the system integrates different communication platforms including, but not limited to, chat, email, SMS, and other forms of remote and/or web-based communications. For example, a user may submit a communication via text message and the system may process the communication and present it to the recipient such that the recipient cannot tell how the communication was sent. In this way, the recipient may view communications sent by SMS, text message, and email, and may respond in a transparent fashion. A user is allowed to change modes of communication either during a single interaction session or in between sessions. In this way, users can continue using the communication system while they are travelling, busy, or otherwise need to alter their mode of communication at various times. In certain embodiments, for example, a user is able to switch to the email mode if the user is busy, or to the SMS mode if the user needs to go offline. In certain embodiments, a client is able to switch modes of communication without the support agent noticing any difference in the agent's interface window. In this way, the support agent may simply respond, and the system automatically communicates the response to the user via the chosen platform.

In certain embodiments, the translation system is completely web-based and does not require installation of any programs beyond a conventional web browser. This characteristic offers simplicity and ease of use to the user. In certain other embodiments, the system and methods are integrated with other programs (including, but not limited to, commercially available programs such as Microsoft® Office Communications Server; proprietary programs such as ticketing and backend ticketing functionalities; RSS feed and feed readers; voice capability and/or transcription programs; and internal company portals).

FIG. 1A depicts an embodiment of a web-based communication service and language translation system 100. The system 100 includes a plurality of users that utilize the internet 106 to communicate across different languages. In the displayed embodiment, at least one of the users employs at least one user device 104 that incorporates a web browser 102. The user utilizes the web browser 102 to relay a message over the internet 106 to Customer Service Agent Computer 110. The Communication Service 108 employed by the Customer Service Agent Computer 110 then facilitates the web-based translation of the incoming message to the Customer Service Agent's preferred language and relays the translated message to the recipient, the Customer Service Agent. The Customer Service Agent can then respond, with the Communication Service 108 facilitating a web-based translation to the user recipient's preferred language. This message is similarly relayed over the internet 106 and via the web browser 102 on the user recipient's device 104.

In other embodiments, however, the user devices 104 include devices that do not contain web browsers. In the displayed embodiment one of the users is a Customer Service Agent that utilizes a Customer Service Agent Computer 110. In other embodiments, however, all users are persons other than Customer Service Agents. Similarly, in other embodiments, all users can utilize user devices other than the Customer Service Agent Computer 110. In the displayed embodiment, the Customer Service Agent Computer 110 incorporates a Communication Service 108 that facilitates the communication and language translation. In other embodiments, the Communication Service 108 can be located outside of the physical confines of, and separate from, a user's device. In the displayed embodiment, at least one of the user's devices 104 is directly connected to the internet 106. In other embodiments, however, one or more of the user devices 104 may not be directly connected to the internet 106. In such embodiments, one or more of the user devices 104 may be directly connected to the Communication Service 108, which is in turn connected to the internet 106.

Figure 1B:
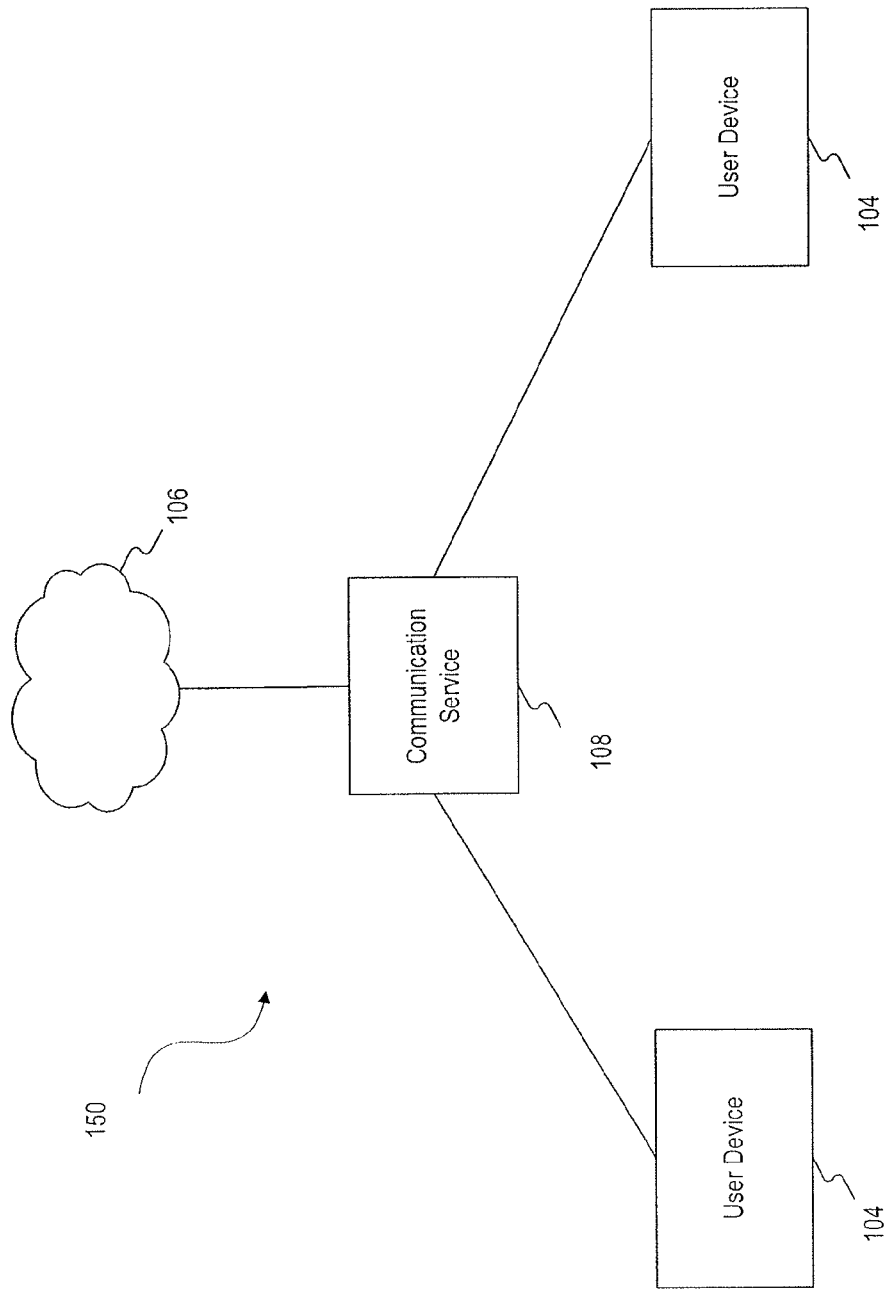
FIG. 1B is a block diagram depicting an embodiment of a web-based communication service and language translation system 150.

FIG. 1B depicts an embodiment of a web-based communication service and language translation system 150. The system 150 includes a plurality of users that utilize the Communication Service 108 and the internet 106 to communicate across different languages. In the displayed embodiment, at least one of the users employs at least one user device 104 that does not incorporate a web browser 102. The sending user utilizes a user device 104 to relay a message directly to the Communication Service 108. The Communication Service 108 then facilitates the web-based translation of the incoming message to the recipient user's preferred language and relays the translated message to the recipient user via the recipient's user device 104. In some embodiments, at least one of the users is a Customer Service Agent. As an example, one embodiment allows a client to communicate across a different language with a Customer Service Agent, with both users utilizing SMS.

Figure 2:
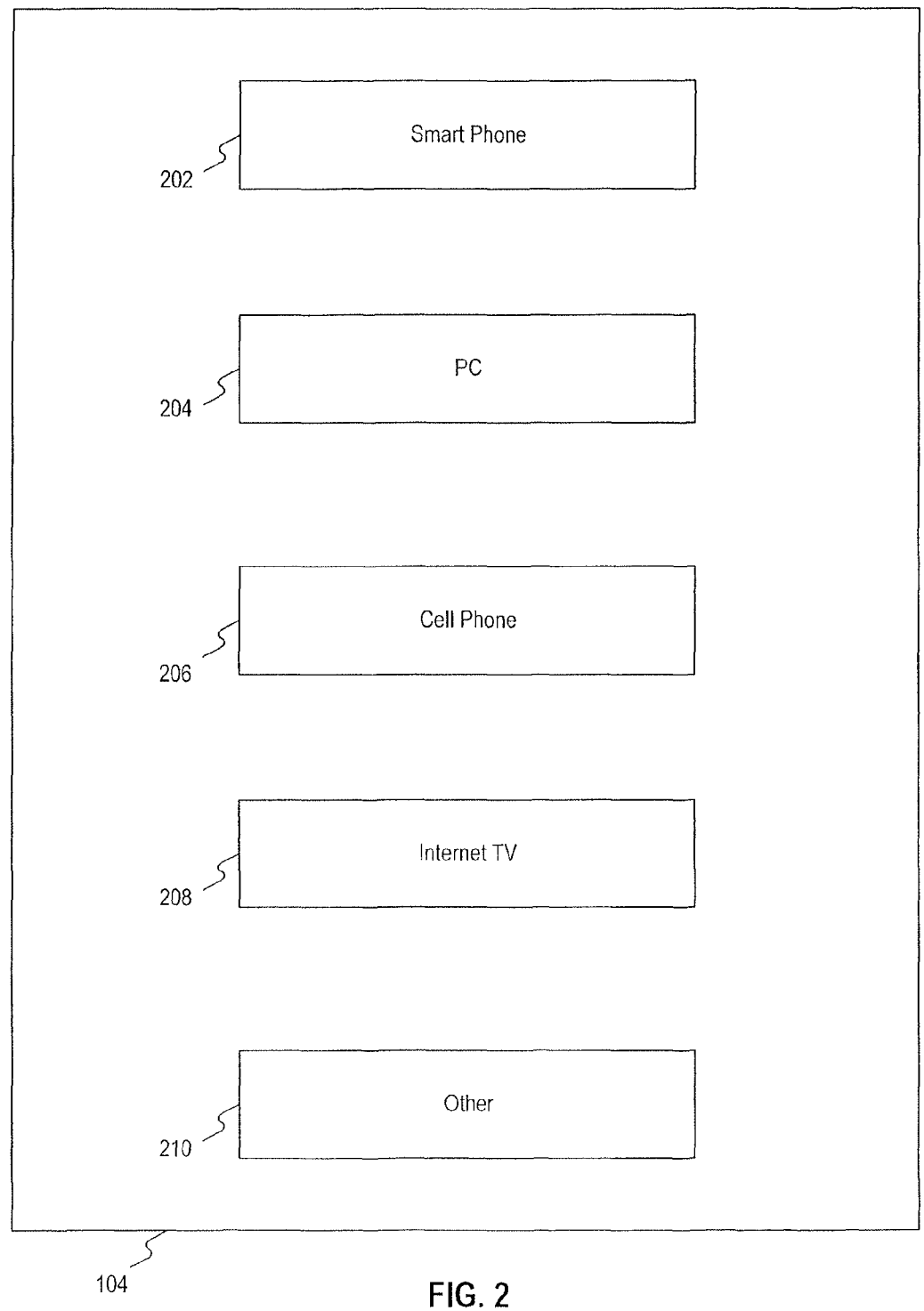
FIG. 2 is a block diagram displaying a plurality of possible user devices 104.

FIG. 2 is a block diagram that displays a plurality of possible user devices 104. These user devices 104 enable users to effectively communicate with each other via the Communication Service 108 and/or the internet 106. In certain embodiments, these devices can be utilized by any of the users involved in any given communication. In certain embodiments, user devices 104, including but not limited to smart phones 202, PCs 204, and internet TVs 208, are able to utilize a web browser 102. In certain embodiments, user devices 104, including but not limited to certain cell phones 206, do not contain a web browser and thus send and receive communications directly to and from the Communication Service 108.

Figure 3:
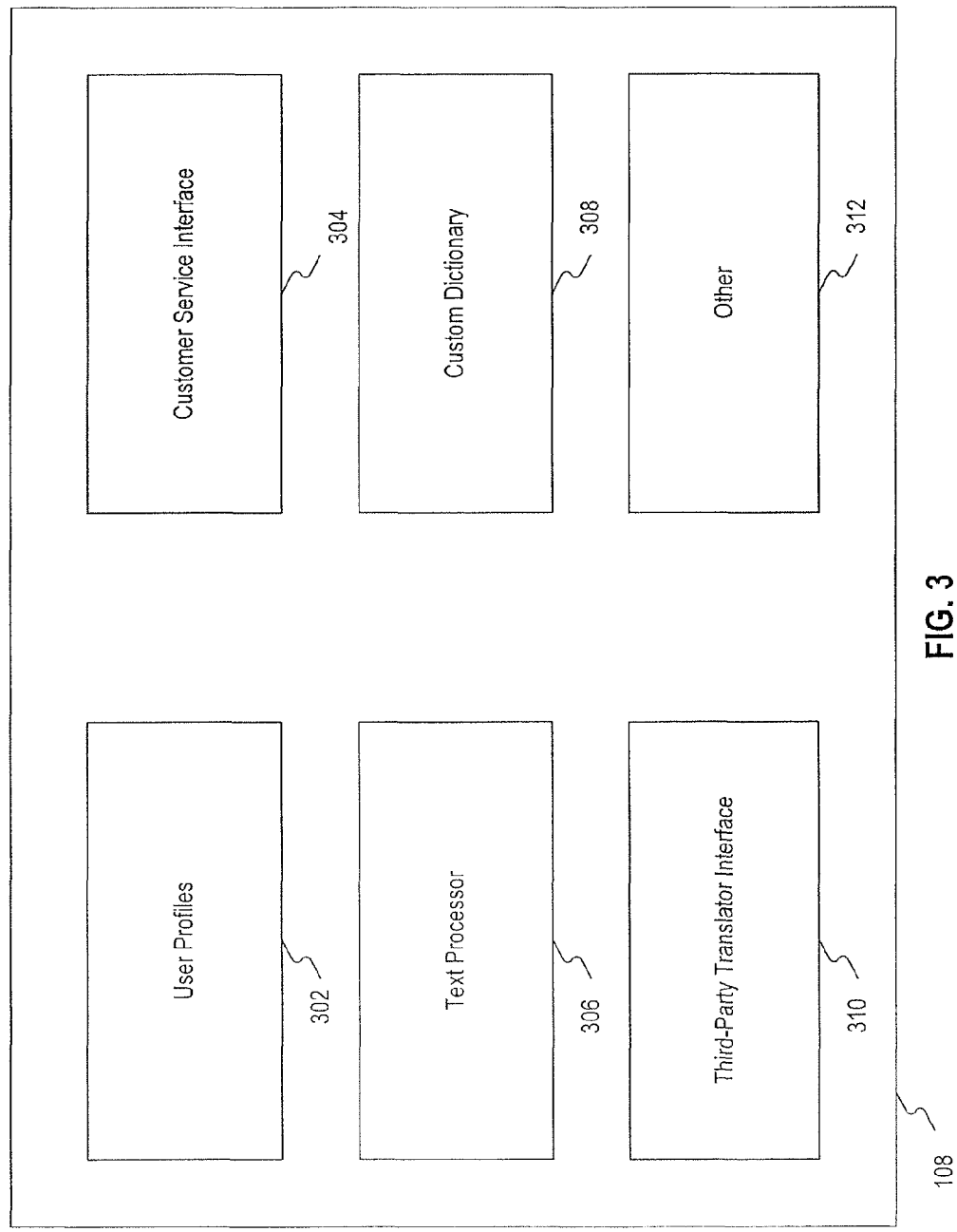
FIG. 3 is a block diagram depicting possible components of the Communication Service 108.

FIG. 3 is a block diagram that depicts possible components of the Communication Service 108. The Communication Service 108 can record User Profiles 302 that can enable the Communication Service 108 to determine a user's preferred language(s) and device(s). In one embodiment, the Communication Service 108, upon receiving an incoming message, can utilize a Text Processor 306 and a Custom Dictionary 308 to process the message. The Text Processor can perform functions of at least a spell-checking program and a grammar program. In one embodiment, the Text Processor 306 automatically corrects any mistakes. In one embodiment, the Text Processor 306 is not utilized; rather a text processor that is inherent in a web browser is used. Thereafter, the Communication Service 108 employs a Third-Party Translator Interface 304 to enable a web-based translation of the received message to the preferred message language of the recipient. In certain embodiments, the translated message is relayed to the Customer Service Interface 304, through which a Customer Service Agent can view at least the displayed message. In another embodiments, both users employ SMS 702. In some such embodiments a sending user can transmit a SMS, which is received and processed by the Communication Service 108. Thereafter, the Communication Service 108 employs the Third-Party Translator Interface 304 to enable a web-based translation of the message. In such an embodiment, the Communication Service 108 then relays the translated message to the Customer Service Agent via SMS 702.

Figure 4:
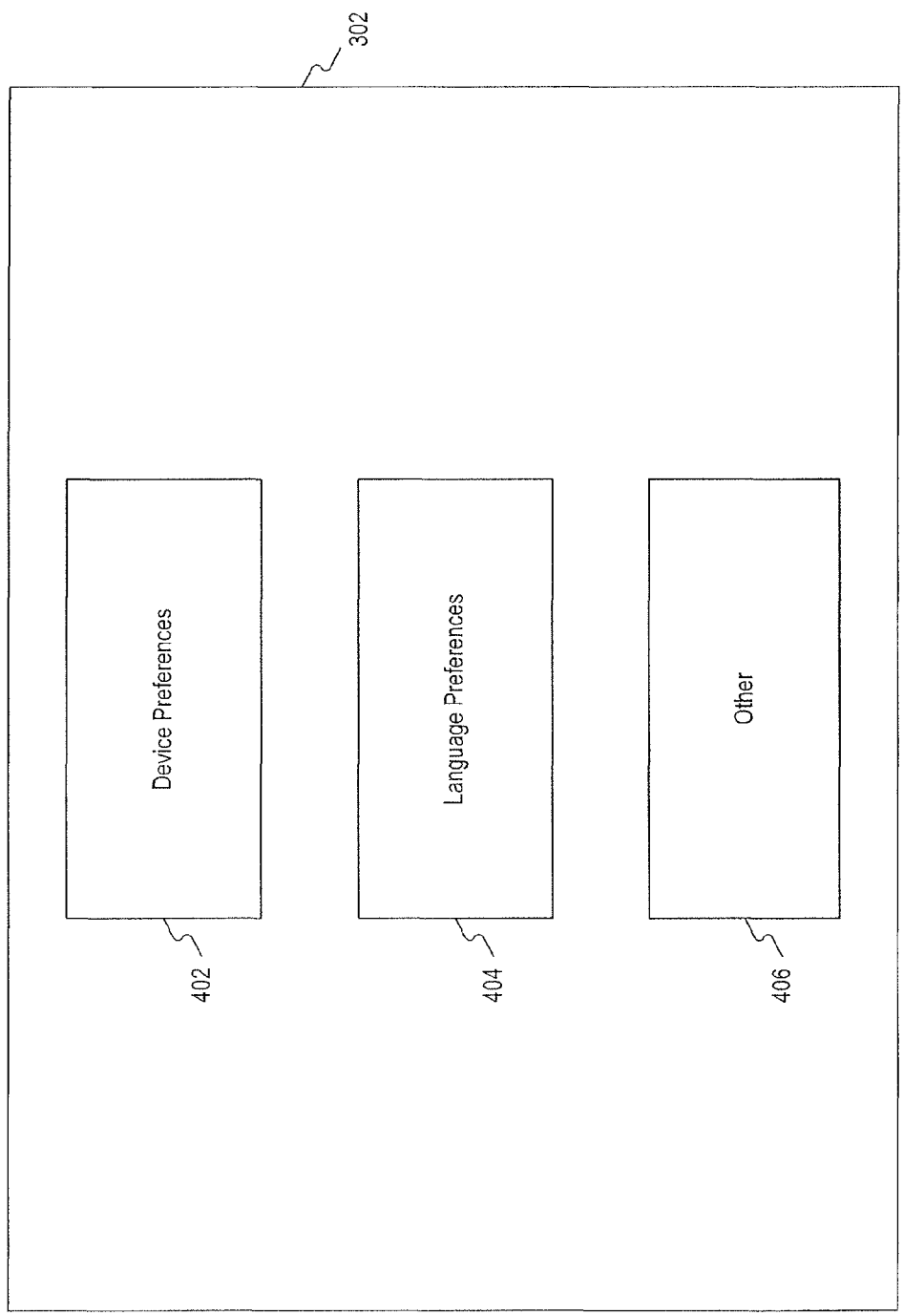
FIG. 4 is a block diagram depicting types of information that can be recorded in User Profiles 302.

FIG. 4 is a block diagram that depicts types of information that can be recorded in User Profiles 302. This information can be recorded for any user, including but not limited to Customer Service Agents and clients. The type of information recorded can include, but is not limited to, the types of devices that a user has utilized and what languages a user has chosen.

Figure 5:
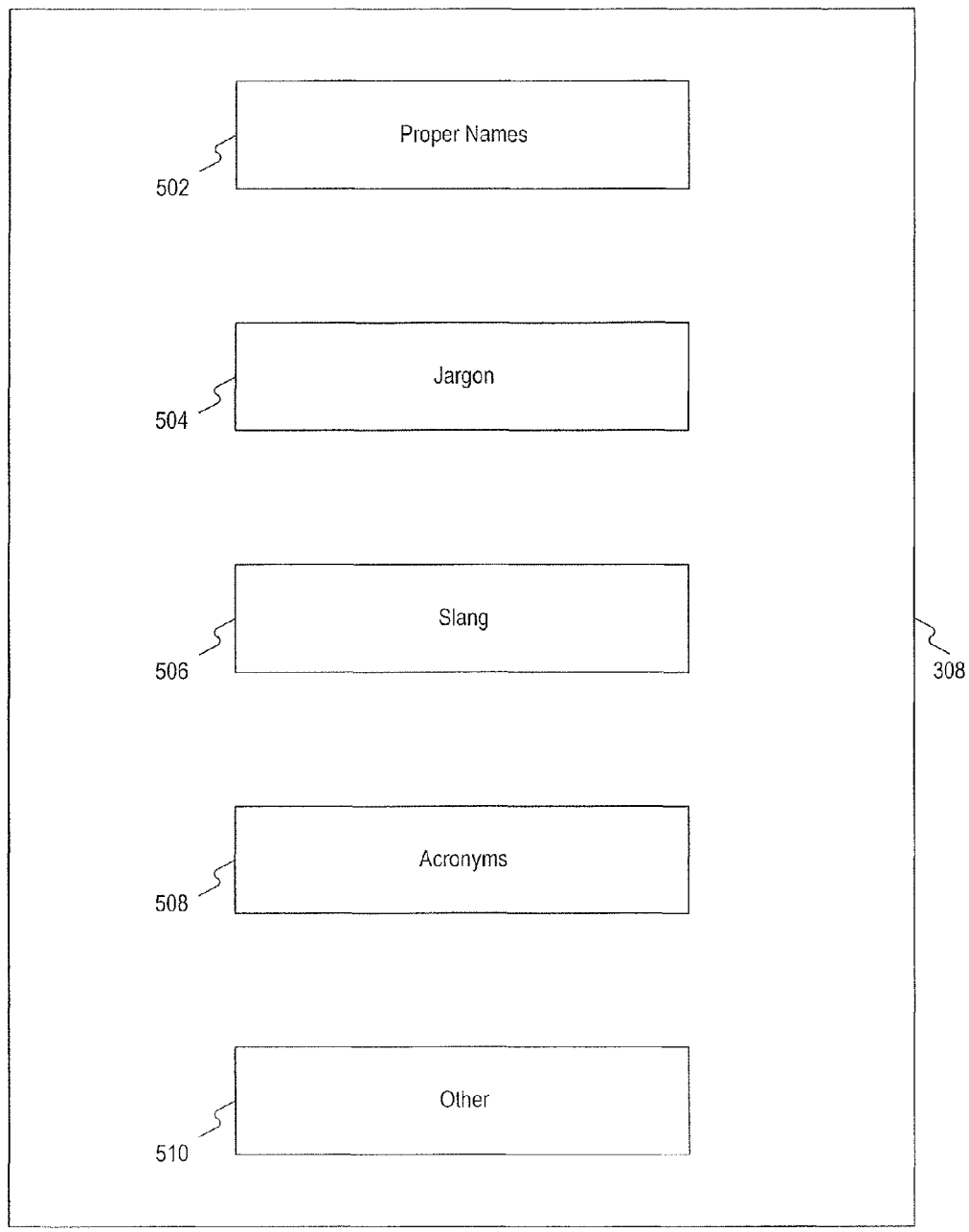
FIG. 5 is a block diagram depicting types of language components that the Custom Dictionary 308 can process.

FIG. 5 is a block diagram that depicts types of language components that the Custom Dictionary can process. In certain embodiments, a Custom Dictionary 308 is used to extract language components from an incoming message. Thereafter, those extracted language components are not translated, but are reinserted into the translated message in original and identical form. In other embodiments, the language extracted by the Custom Dictionary is translated by employing the Third-Party Translator Interface 304 to enable a web-based translation. In other embodiments, the Custom Dictionary 308 is not utilized; rather, a dictionary inherent in a web browser is used.

Figure 6:
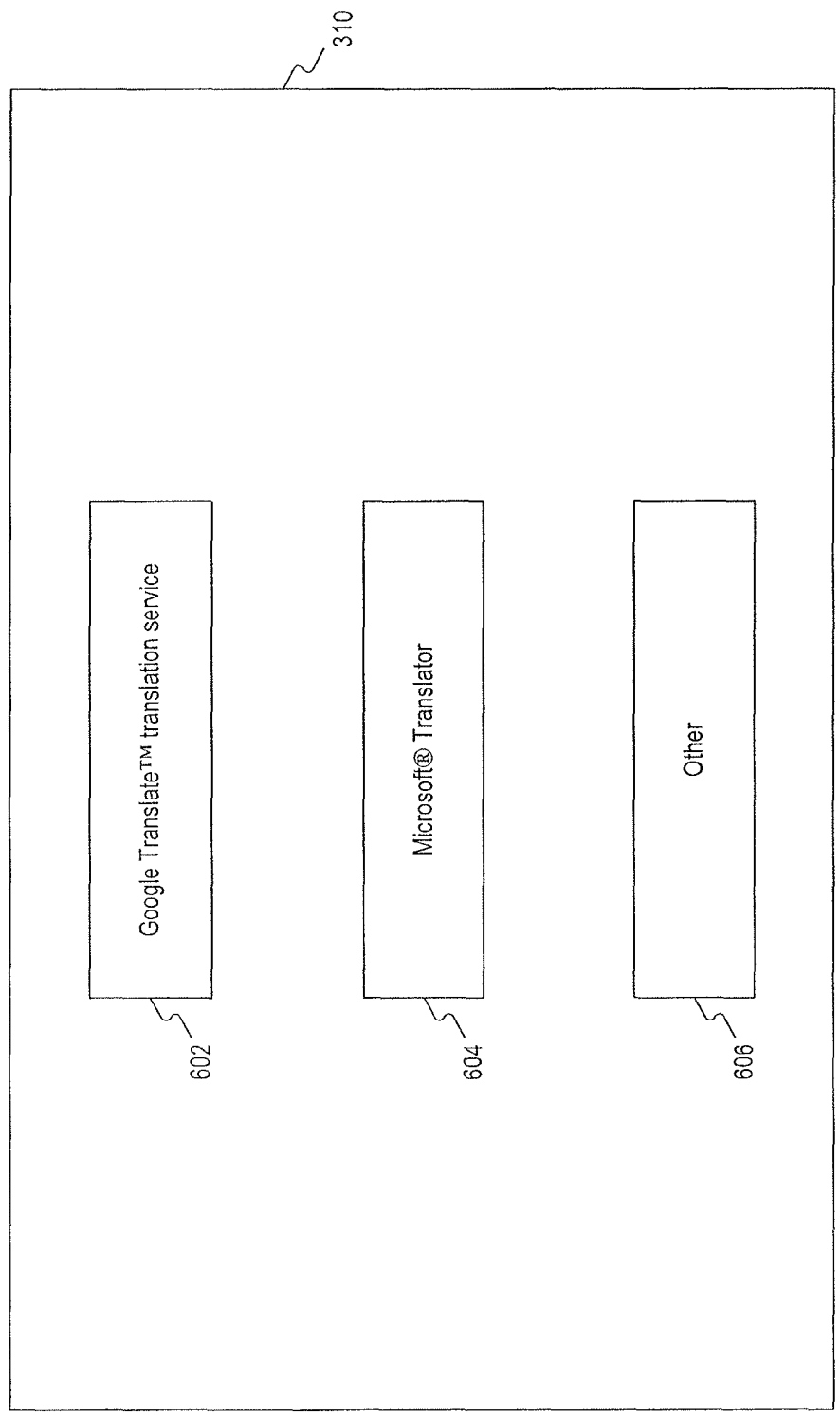
FIG. 6 is a block diagram depicting a plurality of web-based APIs that can be utilized through the Third-Party Interface 310.

FIG. 6 is a block diagram that depicts a plurality of web-based APIs that can be utilized through the Third-Party Interface 310.

Figure 7:
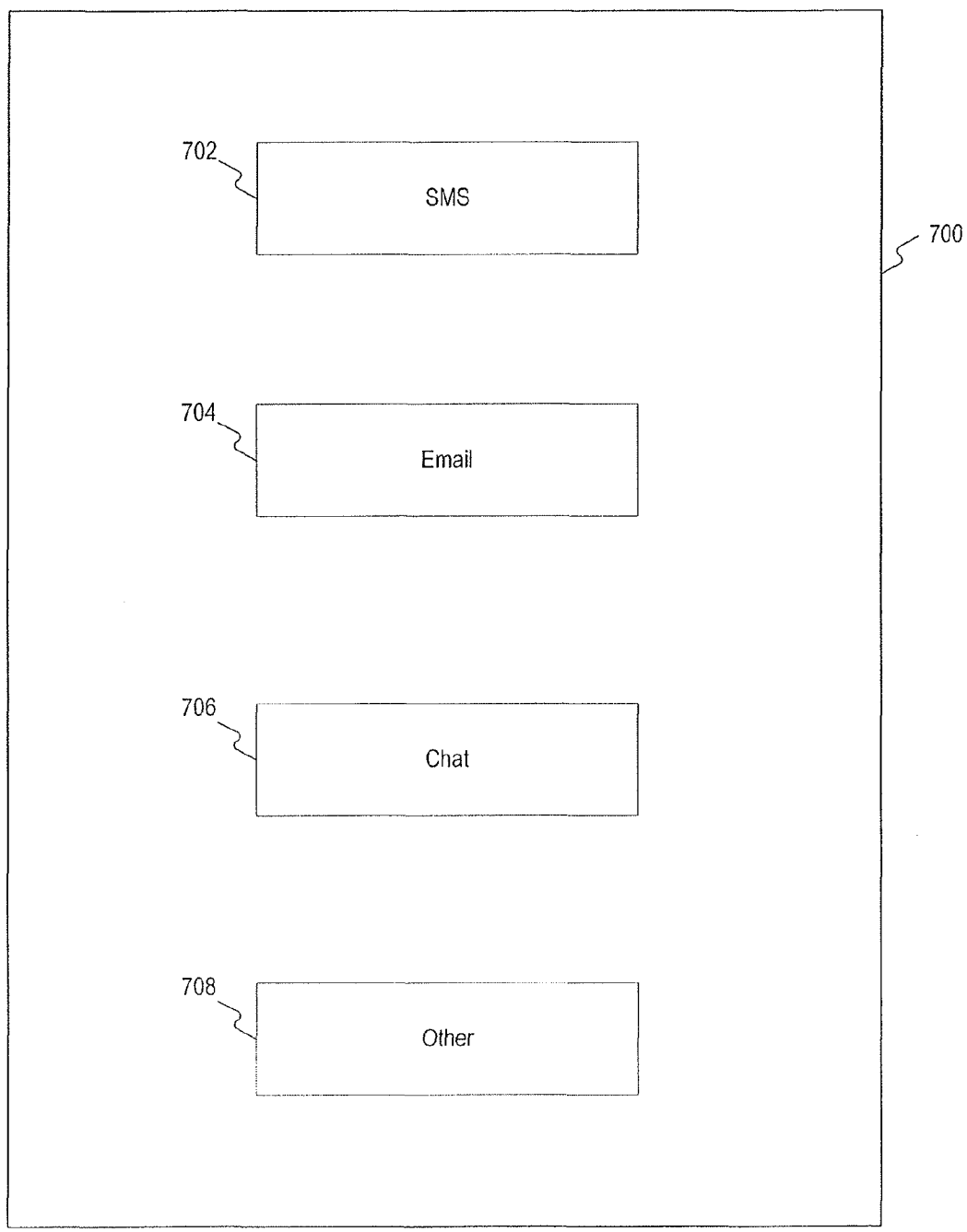
FIG. 7 is a block diagram depicting a plurality of modes of communication 700.

FIG. 7 is a block diagram that depicts a plurality of modes of communication 700. These modes of communication 700 can be enabled by the User Devices 104 that a user can choose. A user's choice of modes of communication 700 can be recorded and stored in User Profiles 302.

Figure 8:
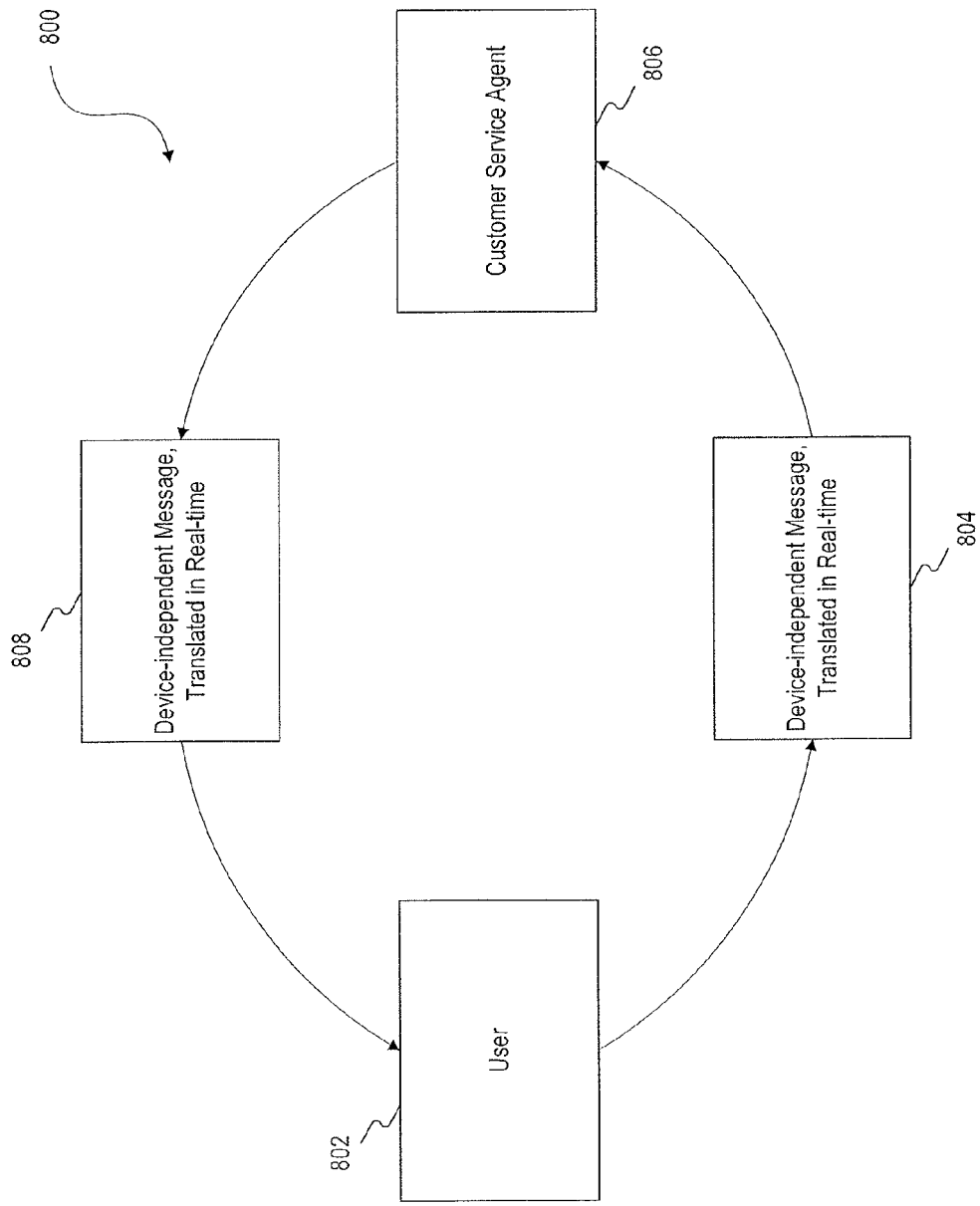
FIG. 8 is a flowchart depicting an embodiment in which a user 802 and a Customer Service Agent 806 communicate in real-time across different languages.

FIG. 8 is a flowchart that depicts an embodiment in which a user 802 and a Customer Service Agent 806 communicate in real-time across different languages. Both the user 802 and the Customer Service Agent 806 are able to communicate in real-time and their ability to send messages is device-independent 804, 808. Both the user 802 and the Customer Service Agent 806 are able to be both a recipient and a sender of messages.

Figure 9:
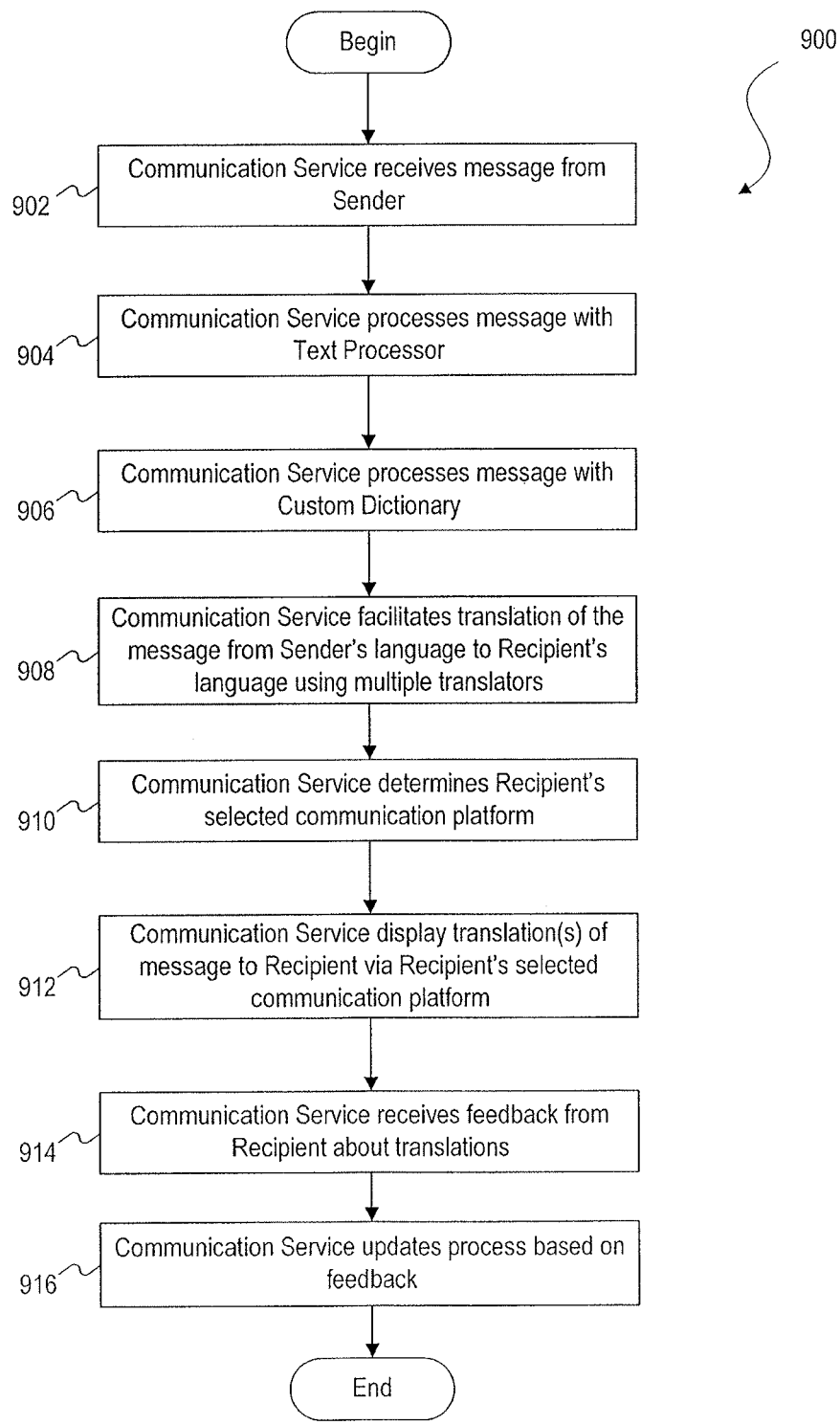
FIG. 9 is a flowchart depicting an embodiment of a web-based communication service and language translation system 900.

FIG. 9 is a flowchart that depicts an embodiment in which the Communication Service 108 receives a message from the sender 902. The Communication Service 108 then processes the sender's message using the Text Processor 904 followed by a Custom Dictionary 906. In certain embodiments the message is processed by the Custom Dictionary 906 before it is processed by the Text Processor 904. In other embodiments the message is only processed by one of either the Text Processor 904 or the Custom Dictionary 906. In other embodiments, the message is not processed by either the Text Processor 904 or the Custom Dictionary 906. In other embodiments, the message is processed by both the Text Processor 904 and the Custom Dictionary 906 in parallel.

Thereafter, the Communication Service 108 can utilize the Third-Party Interface 310 to employ various web-based language translators 602-606. The Communication Service can facilitate the translation of the sender's message by utilizing a plurality of translators 908. In certain embodiments, the Communication Service 108 can determine the recipient's preferred mode of communication 910. Thereafter, the Communication Service 108 can display one or more translations, from one or more of the different available translators 602-606, to the recipient via the preferred mode of communication 912. In certain embodiments, the Communication Service 108 can display a plurality of translations to the message recipient. As an example, in certain embodiments, the recipient can choose Chat 706 as the preferred mode of communication. In certain embodiments, the recipient can further employ a fully functional interface, such as a Customer Service Interface 304, that allows the recipient to utilize drop-down menus to select options including but not limited to alternate message translations. In this way, the recipient can choose which of the plurality of translations is optimally comprehensible. In other embodiments, the recipient can choose a SMS 702 as the preferred mode of communication. In certain embodiments, if the recipient's SMS does not have the capability to display and process various selectable options, including but not limited to alternate message translations, then the Communication Service 108 may only display one preferred translation. In other embodiments, the Communication Service 108 may display a plurality of translations to modes of communication that do not support the display and use of various selectable options.

In certain embodiments, the recipient can choose Chat 706 as the preferred mode of communication, and that certain Chat 706 can employ a fully functional interface, such as a Customer Service Interface 304, that allows the recipient to utilize drop-down menus to select options including but not limited to alternate message translations. In such an embodiment, the recipient can choose from amongst the available translations. In certain embodiments, the Communication Service's 108 preferred translation is initially displayed, with the alternate translations located in a drop-down menu. If a recipient accepts a particular translation, or chooses none of the available translations, the Communication Service 108 records the recipient's choice and uses that feedback 914 to update the process 915. The recipient's response can be combined with responses from other users, and the updates to the process 915 can be crowd sourced. The updates to the process 915 can include, but are not limited to, changes to the algorithm to select the preferred language translation. In certain embodiments, if the recipient selects none of the available translations as acceptable 914, the Communication Service 108, can send further communication to the recipient. This further communication can include, but is not limited to, additional translations, translations of differently worded messages, additional options, etc. In this way, the Communication Service 108 enables the recipient to continue with the communication even if none of the given translations were acceptable.

Figure 10:
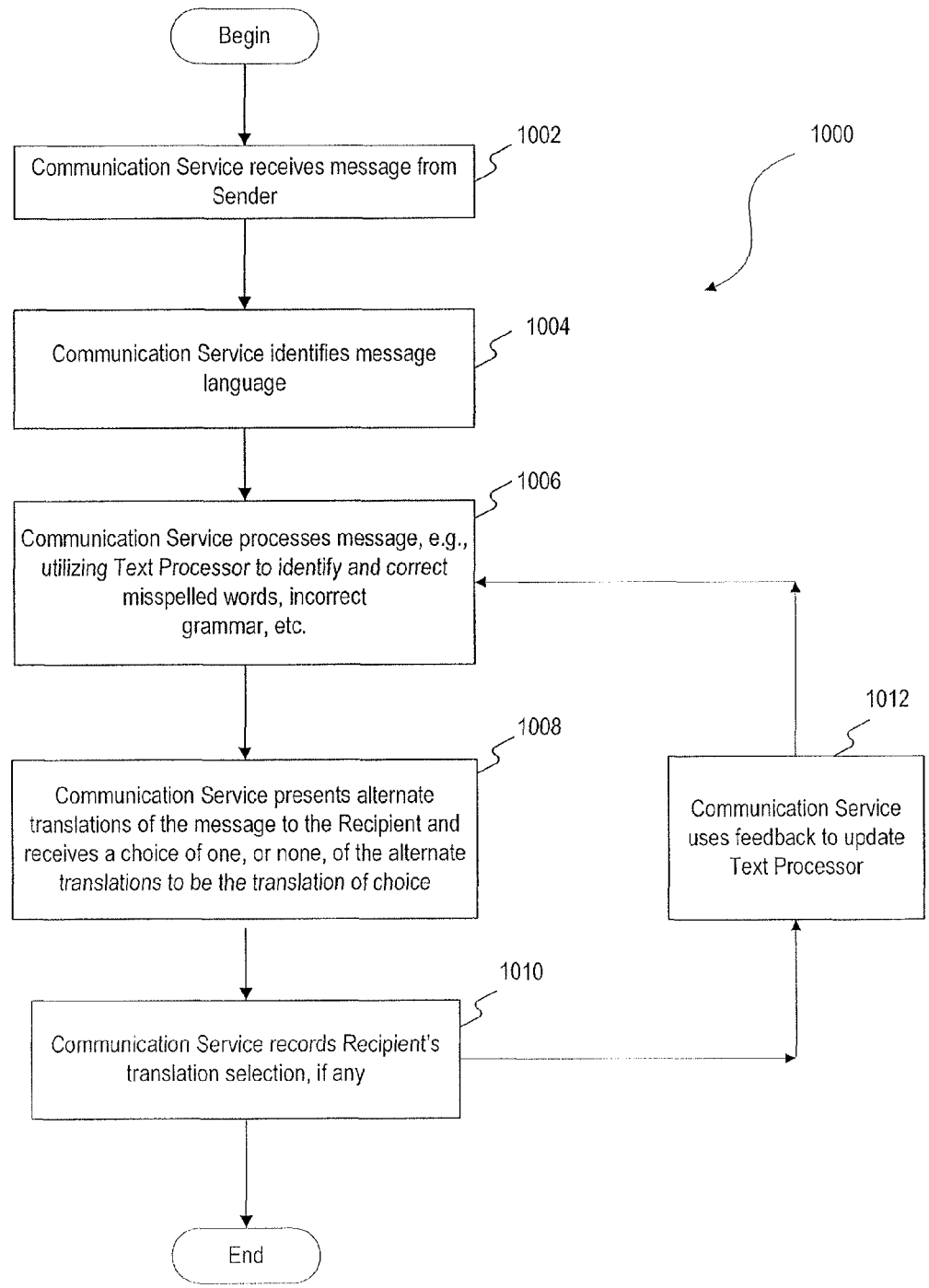
FIG. 10 is a flowchart depicting an embodiment of the use of the Text Processor 1000.

FIG. 10 is a flowchart that depicts an embodiment of the use of the Text Processor 1000. In certain embodiments, the Communication Service 108 can identify the language of the sender's incoming message 1004. In certain embodiments, the Communication Service 108 thereafter processes the message with a Text Processor 306 that is able to identify and correct misspelled words, incorrect grammar, etc. 1006. In certain embodiments, after the Communication Service 108 processes and translates the message, a plurality of translations are available for the recipient to view 1008. In certain embodiments, the recipient may choose from amongst the available translations, or choose none 1008. Thereafter, the Communication Service can record the recipient's selection, if any 1010, and use that information to update the Text Processor 1012.

Figure 11:
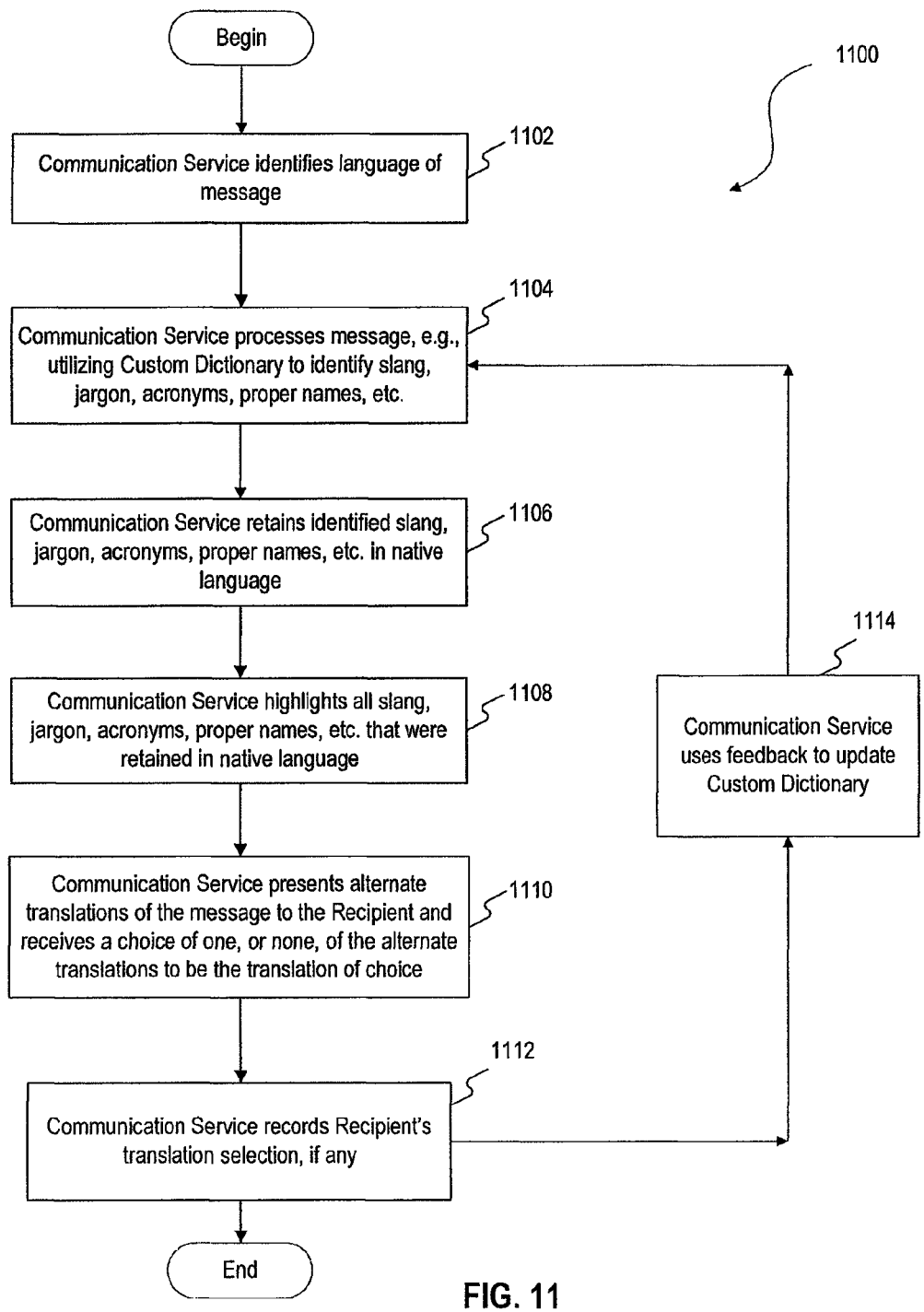
FIG. 11 is a flowchart depicting an embodiment of the use of a Custom Dictionary 1100.

FIG. 11 is a flowchart that depicts one embodiment of the use of a Custom Dictionary 1100. In certain embodiments, the Communication Service 108 can identify the language of the sender's incoming message 1102. In certain embodiments, the Communication Service 108 thereafter processes the message with a Custom Dictionary 308 that is able to identify language that can be difficult for an automated translator to translate, including but not limited to slang, jargon, acronyms, proper names, etc. 1104. In certain embodiments, the Communication Service 108 retains in its native language the language identified by the Custom Dictionary (step 1106). Thereafter, the Communication Service 108 can highlight or otherwise note the retained language for the recipient (step 1108). In other embodiments, the Custom Dictionary 308 translates various language components, including but not limited to, slang, jargon, proper names, etc.

In certain embodiments, after the Communication Service 108 processes and translates the message, a plurality of translations are available for the recipient to view (step 1110). In certain embodiments, the recipient chooses from amongst the available translations, or chooses none (step 1110). The Communication Service 108 may also store the recipient's selection, if any, and use that information to update the Custom Dictionary (step 1114).

Figure 12:
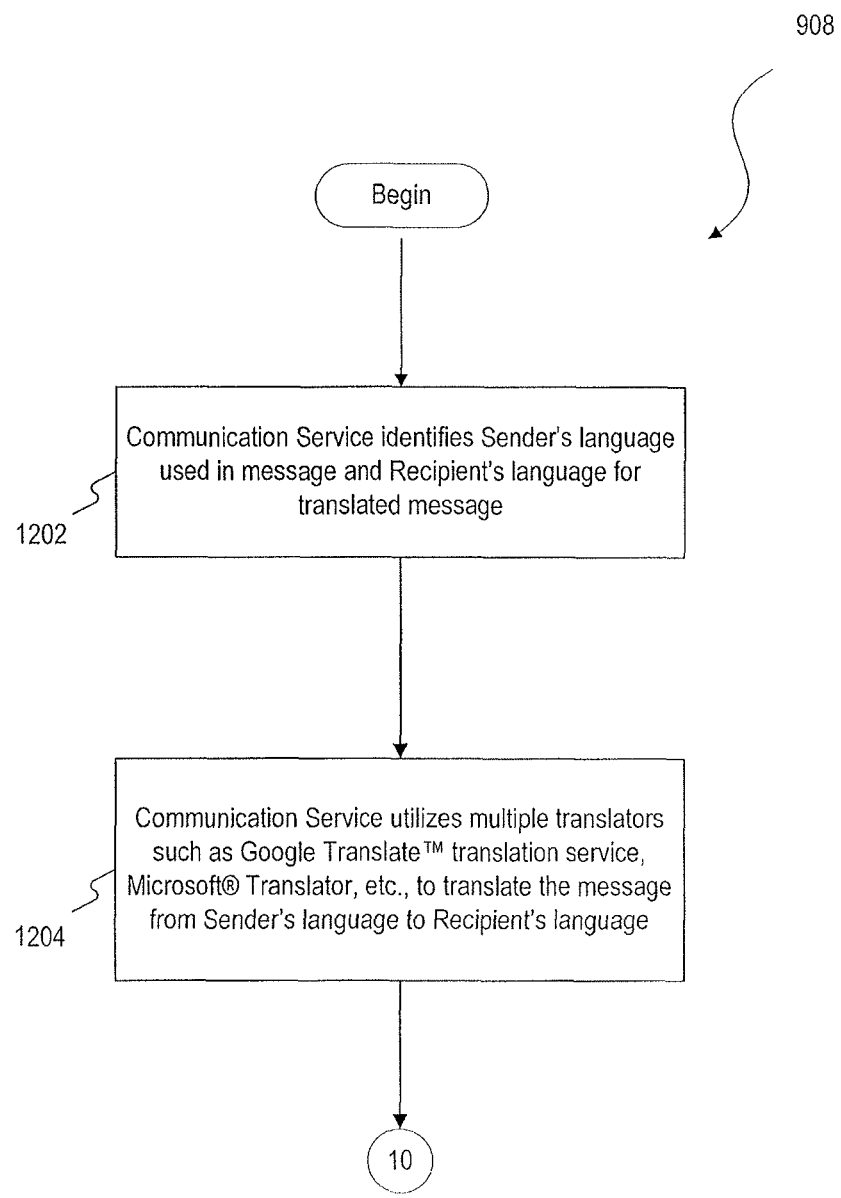
FIG. 12 is a flowchart depicting an embodiment of the process of utilizing one or more third-party translators 908.

FIG. 12 is a flowchart that depicts an embodiment of the process of utilizing one or more third-party translators 908. In certain embodiments, after the Communication Service receives a sender's message, it can identify the sender's language used in the message, as well as the language that the recipient prefers the translated message to be in (step 1202). Thereafter, the Communication Service 108 can employ one or more translators 602-606 to translate the message from the sender's language to the recipient's language (step 1204). In embodiments where multiple translators are used, the resulting translations may be different. This may enable users of the system to select a "best" translation or to see alternative translations for better understanding.

Figure 13:
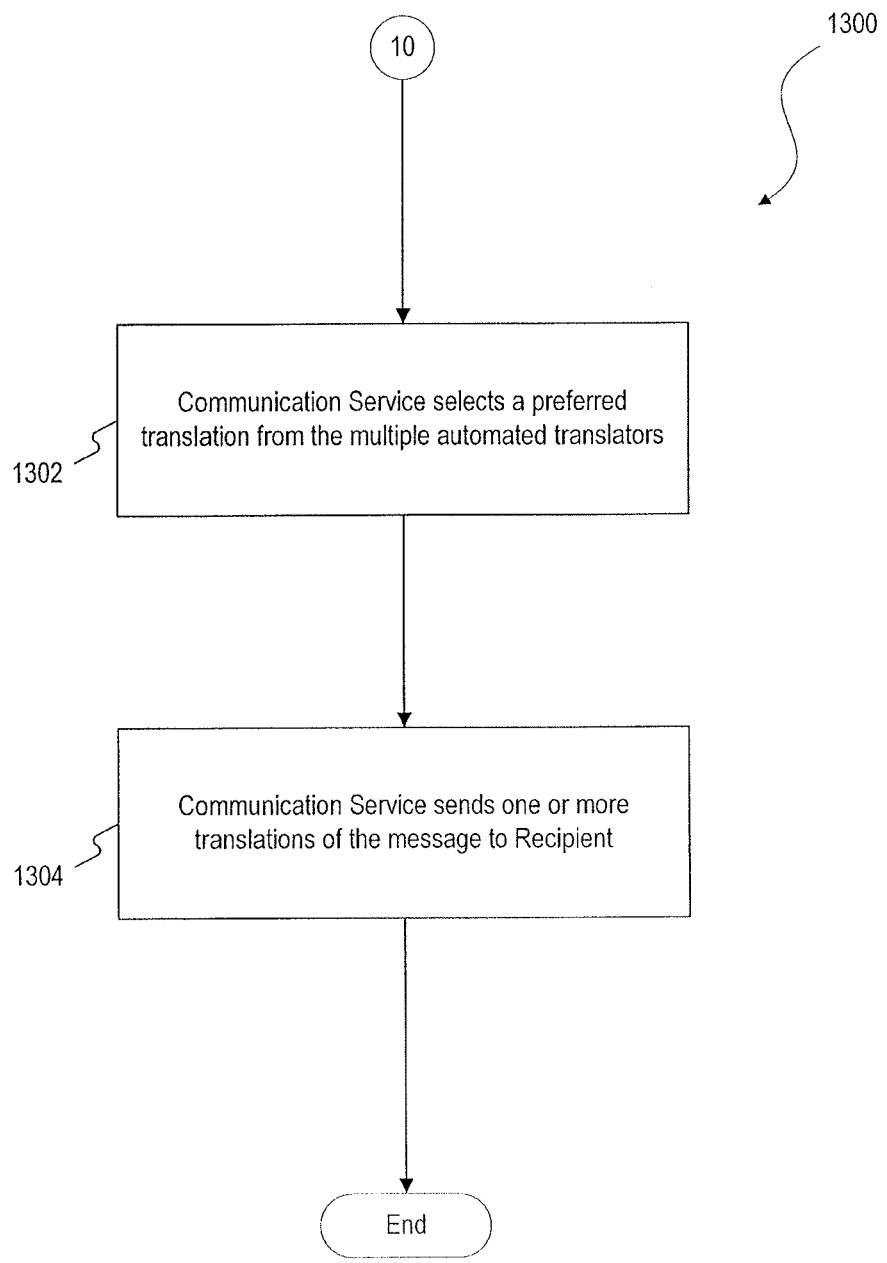
FIG. 13 is a flowchart depicting an embodiment of the Communication Service 108 sending and displaying a preferred translation 1300.

FIG. 13 is a flowchart depicting an embodiment of the Communication Service 108 sending and displaying a preferred translation 1300. In certain embodiments, after the Communication Service 108 utilizes one or more translators 602-606 to translate the sender's message to the recipient's language, the Communication Service 108 can select one translation and send that preferred translation to the recipient 1304. In certain embodiments in which only one translator is used, that translation can be the selected translated message (step 1302). In other embodiments, the Communication Service 108 can send all translations to the recipient. Thereafter, in such embodiments, one of the plurality of translations is designated as the preferred translated message. In certain embodiments, the other alternate translations can be viewed and selected using a drop-down menu.

Figure 14:
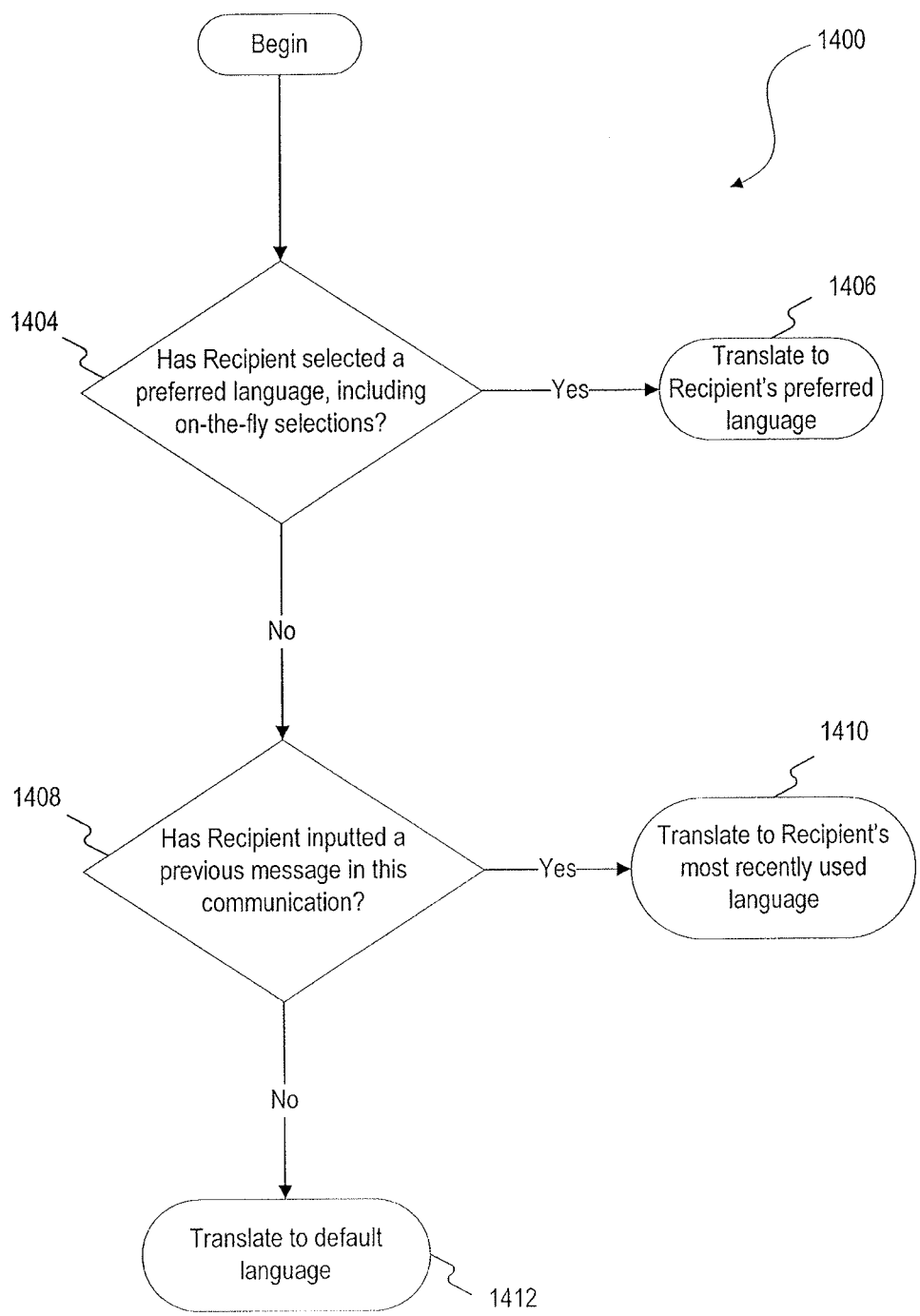
FIG. 14 is a flowchart depicting an embodiment of identifying the language the message is to be translated to 1400.

FIG. 14 is a flowchart depicting a process for identifying the language a message is to be translated to 1400. In certain embodiments, the recipient is able to choose a preferred language on-the-fly (step 1404). In certain embodiments, this choice can be made before, during, or after a single communication session. In this way, the recipient is able to tailor the communication to the situation at hand (e.g., if a colleague of the recipient, who is not fluent in the current language, needs to contemporaneously view the communication). In certain embodiments, if the recipient has specifically requested a particular language in which to receive messages, then the Communication Service 108 can translate the sender's message into that chosen language (step 1406). In certain embodiments, if the recipient has not indicated a preferred language in which to receive messages, and that recipient had previously sent a message, for example in the same communication session (step 1408), then the Communication Service 108 can identify the recipient's most recently used language and translate the sender's message to that language most recently used by the recipient (step 1410). In certain embodiments, if the recipient has not chosen a particular language and the recipient has not previously received or sent a message, then the Communication Service can translate the sender's message to a default language 1412. This default language 1412 may be determined, for example, by utilizing user information stored in User Profiles 302 and Language Preferences 404.

Figure 15:
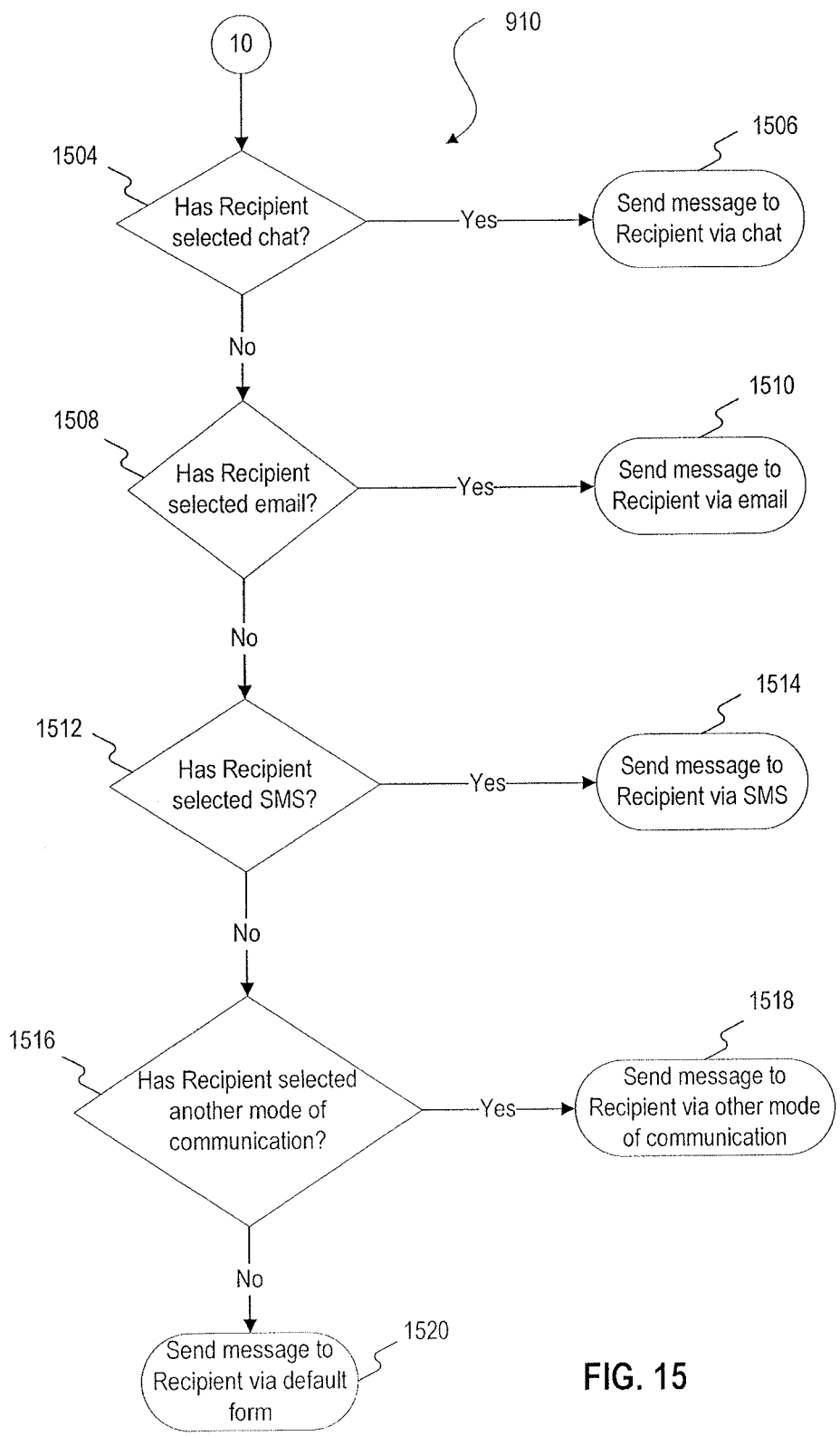
FIG. 15 is a flowchart diagram depicting an embodiment of identifying the recipient's preferred mode of communication 910.

FIG. 15 is a flowchart depicting a process for identifying the recipient's preferred mode of communication 910. In certain embodiments, the recipient is able to choose from a plurality of possible modes of communication 402. In certain embodiments, if the recipient has selected a specific mode of communication, then that mode will be used when relaying the translated message. For example, if the recipient has selected to receive messages via chat (step 1504, Yes), then the message is sent via chat (step 1506). If instead, the recipient has selected to receive messages via email (step 1508, Yes), then the message is sent via email (step 1510). If instead, the recipient has selected to receive messages via SMS (step 1512, Yes), then the message is sent via SMS (step 1514). If instead, the recipient has selected to receive messages via another mode of communication (step 1516, Yes), then the message is sent via the selected other mode of communication (step 1518). If the recipient has not selected a mode of communication in which to receive messages, then the message is sent via a default mode (step 1520). This default mode of communication may be determined, for example, by utilizing user information stored in User Profiles 302 and Device Preferences 402. By selecting various modes of communication, a recipient is able to adjust the communication to the recipient's immediate circumstances. Depending upon the mode and device chosen, however, the Communication Service's 108 functionality may differ. If the recipient has made no specific selection for the mode of communication, then a default mode of communication can be utilized (step 1520). In certain embodiments, if the recipient has already sent or received a message, the default communication mode can be the mode last used by the recipient.

In this way, a user could submit a request for help to a customer service agent via email from his computer at work. If the help is not provided by the time the user needs to leave his office, he may change his selection (e.g., using a drop-down list or radio buttons) to SMS so that he can receive the response from the customer service agent on his phone while en route home from work. Because Communication Service 108 automatically processes the device/mode selection, the customer service agent can simply send a response without needing to know which communication mode the user is using.

A number of embodiments of the invention have been described. Nevertheless, it will be understood that various modifications may be made without departing from the spirit and scope of the invention.

What is claimed is:

1. A method for facilitating communication among a sender and a recipient, the method comprising:
   receiving, by a communication service of a computer, a message in a first language from the sender;
   processing, by the computer, the message to facilitate translation of the message into a second language associated with the recipient, wherein the recipient is a different individual than the sender;
   using, by the computer, a plurality of translators to obtain a plurality of translations of the message in the second language, wherein the plurality of translations are alternate translations;
   presenting, by the computer, the plurality of translations to the recipient;
   receiving, by the computer and from the recipient, a response that includes an indication as to whether at least one of the plurality of translations is acceptable; and
   processing, by the computer, the response from the recipient,
      wherein, when the indication indicates that the one of the plurality of translations is acceptable, processing the response comprises:
         determining a translator, of the plurality of translators, that provided the one of the plurality of translations, and
         storing a notation indicating the translator to be a preferred translator, of the recipient, for providing translations from the first language to the second language.

2. The method of claim 1, wherein processing the message includes using a Text Processor to identify misspellings and/or incorrect grammar in the message in the first language.

3. The method of claim 1, wherein processing the message includes using a Custom Dictionary to identify jargon, acronyms, proper names, and slang in the message in the first language.

4. The method of claim 1, further comprising:
   determining the second language based on one of user selection, a previously stored user profile, or language used in a previous message sent by the recipient.

5. The method of claim 1, wherein presenting the plurality of translations to the recipient includes:
   presenting an indication of terms retained in the first language.

6. The method of claim 1, wherein the response is a selection of one of the plurality of translations.

7. The method of claim 1, wherein the indication indicates that none of the plurality of translations is acceptable.

8. The method of claim 1, wherein processing the response includes:
   storing at least one of the response, information identifying the first language, or information identifying the second language.

9. The method of claim 1, wherein processing the response includes:
   sending further communication to the recipient that enables the recipient to continue with the communication even if the recipient indicates that none of the plurality of translations is acceptable.

10. The method of claim 1, wherein processing the response includes:
    combining the response with similar responses; and
    updating the method based at least in part on the response.

11. The method of claim 10, wherein updating the method includes updating at least one of a language selection algorithm, a Text Processor, or a Custom Dictionary.

12. A method for facilitating communication among a sender and a recipient, the method comprising:
    receiving, by a communication service of a computer, a message in a first language from the sender via a communication device;
    using, by the computer, a plurality of translators to obtain a plurality of translations of a message in a second language,
       wherein the plurality of translations are alternate translations;
    presenting, by the computer, the plurality of translations to the recipient;
    receiving, by the computer and from the recipient, a response that includes an indication as to whether at least one of the plurality of translations is acceptable; and
    processing, by the computer, the response from the recipient,
       wherein, when the indication indicates that the one of the plurality of translations is acceptable, processing the response comprises:
          determining a translator, of the plurality of translators, that provided the one of the plurality of translations, and
          storing a notation indicating the translator to be a preferred translator, of the recipient, for providing translations from the first language to the second language;
    receiving, by the communication service, a responding message in the second language from the recipient directed to the sender;
    determining, by the computer, a current device preference of the sender;
    determining, by the computer, a current language preference of the sender;
    using, by the computer, a plurality of translators to obtain a plurality of translations of the responding message in a currently preferred language, of the sender, based on the current language preference;
    presenting, by the computer, at least one of the plurality of translations of the responding message to the sender via a currently-preferred device, of the sender, based on the current device preference.

13. The method of claim 12, wherein the current device preference is stored in a user profile.

14. The method of claim 12, wherein the current device preference is received from the sender during the communication.

15. The method of claim 12, wherein the currently-preferred device is different from the communication device.

16. The method of claim 12, wherein the communication device does not require any software related to the communication service.

17. The method of claim 12, where determining the current language preference comprises:
   determining the current language preference of the sender based on one of user selection, a previously-stored user profile, or language used in a previous message by the sender.

18. The method of claim 12, wherein the first language and the currently-preferred language are different.

19. A system for facilitating communication between a sender operating a sender device and a recipient, the system comprising:
   a computer processor; and
   memory containing instructions which, when executed by the computer processor, cause the computer processor to:
      receive a message in a first language from the sender;
      process the message to facilitate translation of the message into a second language;
      use one or more of a plurality of translators to obtain a plurality of translations of the message in the second language,
      wherein the plurality of translations are alternate translations;
      present the plurality of translations to the recipient;
      receive, from the recipient, a response that includes an indication as to whether at least one of the plurality of translations is acceptable; and
      process the response from the recipient,
      wherein, when processing the response and when the indication indicates that the one of the plurality of translations is acceptable, the computer processor is to:
         determine a translator, of the plurality of translators, that provided the one of the plurality of translations, and
         store a notation indicating the translator to be a preferred translator, of the recipient, for providing translations from the first language to the second language.

20. The system of claim 19, wherein, when processing the message, the computer processor is to:
   use a Text Processor to identify at least one of a misspelling or incorrect grammar in the message in the first language.

21. The system of claim 19, wherein, when processing the message, the computer processor is to:
   use a Custom Dictionary to identify at least one of jargon, an acronym, a proper name, or slang in the message in the first language.

22. The system of claim 19, where the computer processor is to:
   determine the second language based on one of user selection, a previously stored user profile, or language used in a previous message by the recipient.

23. The system of claim 19, wherein, when presenting the plurality of translations the computer processor is to:
   present an indication of terms retained in the first language.

24. The system of claim 19, wherein the response is a selection of one of the plurality of translations.

25. The system of claim 19, wherein the indication indicates that none of the plurality of translations is acceptable.

26. The system of claim 19, wherein, when processing the response, the computer processor is to:
   store at least one of the response, information identifying the first language, or information identifying the second language.

27. The system of claim 19, wherein, when processing the response, the computer processor is to:
   send further communication to the recipient that enables the recipient to continue with the communication even if the indication indicates that none of the plurality of translations is acceptable.

28. The system of claim 19, wherein, when processing the response, the computer processor is to:
   combine the response with similar responses; and
   update a method used for the communication based on the response.

29. The system of claim 28, wherein, when updating the method, the computer processor is to:
   update at least one of a language selection algorithm, a Text Processor, or a Custom Dictionary.

* * * * *